(12) United States Patent
Vacca et al.

(10) Patent No.: US 8,347,831 B2
(45) Date of Patent: Jan. 8, 2013

(54) SEALED CONTROL VALVE FOR A FLUID FLOW CIRCUIT

(75) Inventors: Frederic Vacca, Champs (FR); Christian Durupt, Marcousis (FR)

(73) Assignee: Valeo Systemes Thermiquest, Le Mesnil Saint Denis (FR)

( * ) Notice: Subject to any disclaimer, the term of this patent is extended or adjusted under 35 U.S.C. 154(b) by 1021 days.

(21) Appl. No.: 12/092,533

(22) PCT Filed: Nov. 2, 2006

(86) PCT No.: PCT/EP2006/068048
§ 371 (c)(1), (2), (4) Date: Sep. 18, 2008

(87) PCT Pub. No.: WO2007/051825
PCT Pub. Date: May 10, 2007

(65) Prior Publication Data
US 2009/0065172 A1    Mar. 12, 2009

(30) Foreign Application Priority Data

Nov. 4, 2005  (FR) ..................... 05 11273

(51) Int. Cl.
*F01P 7/14* (2006.01)
*F16K 5/10* (2006.01)

(52) U.S. Cl. ............. 123/41.08; 123/41.09; 137/625.46; 137/625.47; 137/872; 251/208; 251/209; 251/214; 251/304; 251/309

(58) Field of Classification Search ............... 123/41.08, 123/41.09; 137/625.46, 625.47, 872; 251/208, 251/304, 209, 214, 309, 310, 368
See application file for complete search history.

(56) References Cited

U.S. PATENT DOCUMENTS

| | | | | |
|---|---|---|---|---|
| 4,410,003 A | * | 10/1983 | Sandling | 137/312 |
| 4,478,388 A | * | 10/1984 | George | 251/309 |
| 4,494,730 A | * | 1/1985 | George | 251/309 |
| 4,506,697 A | * | 3/1985 | Marchant | 137/312 |
| 5,110,086 A | * | 5/1992 | Meuleman | 251/118 |
| 5,116,019 A | * | 5/1992 | Rohweder et al. | 251/127 |

(Continued)

FOREIGN PATENT DOCUMENTS

EP    1156243 A1    11/2001

(Continued)

OTHER PUBLICATIONS

FR 2849485 extracted from Delphion.com database, dated Jan. 30, 2009, for English abstract see English equivalent US 2006/0214017.

(Continued)

*Primary Examiner* — Noah Kamen
*Assistant Examiner* — Grant Moubry
(74) *Attorney, Agent, or Firm* — Howard & Howard Attorneys PLLC

(57) ABSTRACT

A control valve for a fluid flow circuit comprises a body that has a fluid inlet and at least two fluid outlets (20, 22, 24) and that defines an axisymmetric housing for a modulating member capable of rotating about an axis of rotation (XX) and adopting different angular positions to control the distribution of the fluid through the outlets. The body comprises a side wall (16) into which the fluid outlets open. The side wall (16) and/or the modulating member comprises sunken areas (EV) and non-sunken areas (CR), the sunken areas (EV) serving to reduce the surface area of the modulating member (26) in contact with the side wall (16).

20 Claims, 5 Drawing Sheets

U.S. PATENT DOCUMENTS

| | | | |
|---|---|---|---|
| 5,871,032 A | 2/1999 | Ko | |
| 5,901,944 A * | 5/1999 | Ramakrishnan et al. | 251/304 |
| 6,132,197 A * | 10/2000 | Adamovski et al. | 418/191 |
| 6,164,248 A * | 12/2000 | Lehmann | 123/41.1 |
| 6,386,150 B1 * | 5/2002 | Iwaki | 123/41.1 |
| 6,681,805 B2 * | 1/2004 | McLane et al. | 137/625.47 |
| 6,974,121 B2 * | 12/2005 | Koester et al. | 251/174 |
| 6,976,505 B2 * | 12/2005 | McLane et al. | 137/625.11 |
| 7,168,397 B2 * | 1/2007 | Chanfreau et al. | 123/41.01 |
| 7,255,130 B2 * | 8/2007 | Martins et al. | 137/625.46 |
| 7,302,919 B2 * | 12/2007 | Vacca et al. | 123/41.1 |
| 7,984,700 B2 * | 7/2011 | Chanfreau et al. | 123/41.1 |
| 2001/0042525 A1 * | 11/2001 | Lehmann | 123/41.1 |
| 2005/0151107 A1 * | 7/2005 | Shu | 251/214 |
| 2006/0214017 A1 | 9/2006 | Vacca et al. | |
| 2007/0251582 A1 | 11/2007 | Farkh et al. | |

FOREIGN PATENT DOCUMENTS

| | | |
|---|---|---|
| FR | 2849485 A1 | 7/2004 |
| FR | 2870313 A1 | 11/2005 |

OTHER PUBLICATIONS

FR 2870313 extracted from Delphion.com database, dated Jan. 30, 2009, for the English abstract see English equivalent US 2007/0251582.

PCT International Search Report for PCT/EP2006/068048, dated Jan. 25, 2007, 3 pages.

* cited by examiner

SEALED CONTROL VALVE FOR A FLUID FLOW CIRCUIT

RELATED APPLICATIONS

This application claims priority to and all the advantages of International Patent Application No. PCT/EP2006/068048, filed on Nov. 2, 2006, which claims priority to French Patent Application No. FR 0511273, filed on Nov. 4, 2005.

TECHNICAL FIELD

The invention relates to a control valve intended for a fluid flow circuit, such as a cooling circuit for a motor vehicle heat engine.

PRIOR ART

The valve of the invention is of the type that comprises a body that has a fluid inlet and at least two fluid outlets and that defines an axisymmetric housing for a modulating member capable of rotating about an axis of rotation and adopting different angular positions to control the distribution of the fluid through the outlets. The body comprises an end wall into which the fluid inlet opens and a side wall into which the fluid outlets open. The modulating member is surrounded by a part-annular seal in the shape of an open ring which is coupled in rotation to the modulating member and is mounted with a small clearance about the modulating member, so that the part-annular seal can be pressed against the inside of the side wall so that the pressure of the fluid has a sealing action.

This type of valve can be called a "rotary valve" because its modulating member rotates about an axis of rotation. In a valve of this type, the side wall usually defines a cylindrical housing suitable for accommodating the modulating member, which is of a corresponding cylindrical shape.

Fluid entering the valve body through the fluid inlet is distributed between the fluid outlets on the basis of the angular position of the modulating member. In this type of control valve a seal must be formed between the modulating member and the side wall of the valve body. The purpose of this seal is to prevent accidental leaks of fluid to an outlet, when this outlet must be closed by the modulating member. Various solutions have already been proposed for forming such a seal.

French patent application published as number FR 2 849 485 discloses an example of a rotary valve in which a part-annular seal mounted between the modulating member and the side wall of the valve body creates the seal.

SUMMARY OF THE INVENTION

It is a particular object of the invention to provide a control valve of the type described in which friction between the modulating member and the valve body is reduced but there is no leakage between them. The purpose of this is among other things to avoid having an over-sized means to turn the modulating member inside the valve body.

In a first aspect, the invention provides a control valve for a fluid flow circuit. The control valve comprises a body that has a fluid inlet and at least two fluid outlets and that defines an axisymmetric housing for a modulating member capable of rotating about an axis of rotation and adopting different angular positions to control the distribution of the fluid through the outlets. The body comprises a side wall.

In accordance with the invention, the side wall and/or the modulating member comprises sunken areas and non-sunken areas, the sunken areas serving to reduce the surface area of the modulating member in contact with the side wall.

In a preferred embodiment of the invention, the modulating member is made up of two parts. One of the two parts is a part-annular seal in the shape of an open ring, which has an inside surface and an outside surface, is coupled in rotation to the modulating member, and is mounted with a small clearance (j) about the modulating member. The part-annular seal can therefore be pressed against the inside of the side wall so that the pressure of the fluid has a sealing action.

In a preferred embodiment of the invention, the sunken areas (EV) and the non-sunken areas (CR) are located on an inside face of the side wall.

In a preferred embodiment of the invention, a non-sunken area of the side wall in contact with the surface of the part-annular seal is covered by a film of low-friction material. It may in particular be a material chosen from the group comprising polyamides, polytetrafluoroethylene, polytetrafluoroethylene filled with molybdenum, epoxy phenolic resin filled with polytetrafluoroethylene and graphite, and polyamideimide filled with polytetrafluoroethylene.

Also in a preferred embodiment of the invention, a non-sunken area of the side wall in contact with the surface of the part-annular seal is provided with microembossing to allow a fluid film to be created between the part-annular seal and the area of the side wall in contact with the surface of the part-annular seal.

Also in a preferred embodiment of the invention, the fluid outlets formed in the side wall are defined by non-sunken areas.

Also in a preferred embodiment of the invention, the modulating member and the part-annular seal have reliefs of mating shapes to enable them to be coupled in rotation.

Also in a preferred embodiment of the invention, the side wall of the valve body defines a cylindrical housing, and the outside surface of the part-annular seal is a cylindrical outside surface.

Also in a preferred embodiment of the invention, the fluid inlet opens axially into an end wall of said valve body, while the fluid outlets open radially into the side wall of the valve body.

Also in a preferred embodiment of the invention, the sunken areas form essentially rectangular areas.

Also in a preferred embodiment of the invention, two portions of the outside surface of the part-annular seal are positioned above non-sunken areas of the side wall, each portion forming a boundary to the part-annular seal, and the portions being located at respective opposite edges of the part-annular seal.

In another aspect, the invention relates to a fluid flow circuit comprising a control valve as defined above, in which the fluid inlet is connected to a fluid source and in which the fluid outlets are connected to respective lines of the circuit.

Such a circuit is advantageously constructed in the form of a cooling circuit for a motor vehicle heat engine through which a coolant is pumped by a circulating pump.

The control valve is thus advantageously a three-way valve whose fluid inlet is connected to an intake of coolant from the engine and whose three fluid outlets are connected respectively to a first circuit line containing a cooling radiator, to a second circuit line forming a branch of the cooling radiator, and to a third circuit line containing an air heater for heating the passenger compartment.

BRIEF DESCRIPTION OF THE DRAWINGS

The following description, which is given purely by way of example, refers to the appended drawings, in which.

DESCRIPTION OF ILLUSTRATIVE EMBODIMENTS

In prior art forms of control valves, contact between the modulating member and the side wall of the valve body tends to generate friction which must be overcome when turning the modulating member. The friction rises as the pressure of the fluid entering the valve body increases.

This therefore necessitates a large force, either manually or from an actuator, when turning the modulating member.

The invention overcomes this disadvantage.

It is a particular object of the invention to provide a control valve of the type described, in which friction between the modulating member and the valve body is reduced, but fluidtightness between them is increased.

Figure 1:
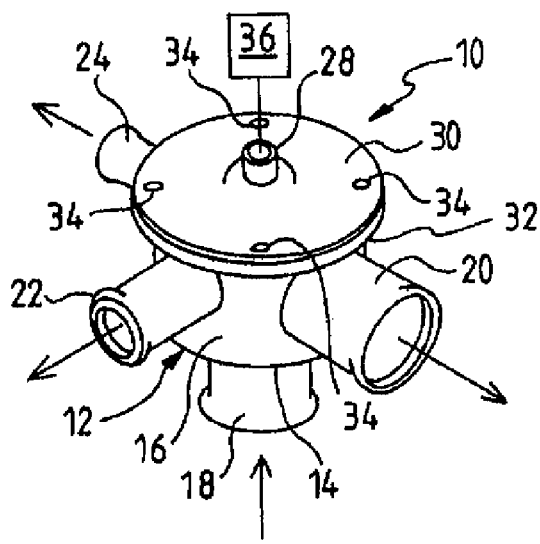
FIG. 1 is a perspective view of a three-way control valve in an illustrative embodiment of the invention.
Figure 2:
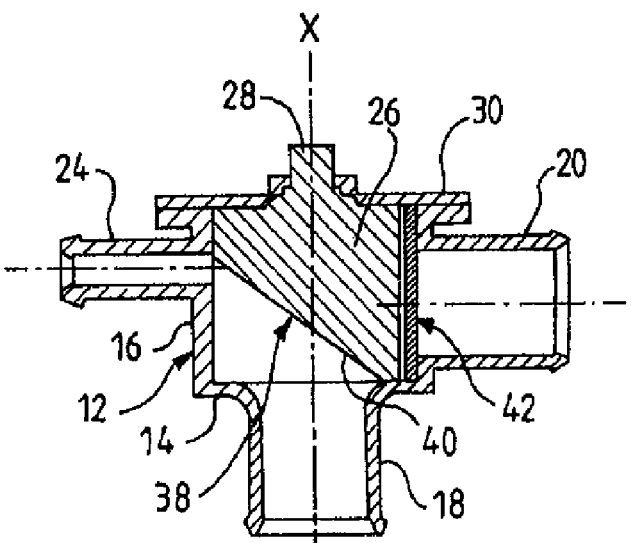
FIG. 2 is a cross section through the control valve seen in FIG. 1, the cutting plane containing the axis of rotation of the modulating member.

FIGS. 1 and 2 show a control valve 10 that comprises a cylindrical body 12 limited by an end wall 14 and a cylindrical side wall 16 of axis XX. Opening axially into the end wall 14 is a fluid inlet port 18. Opening into the cylindrical side wall 16 are three fluid outlet ports 20, 22 and 24. In the illustrative embodiment, the outlet ports 20, 22 and 24 open radially through the wall 16. Ports 20 and 24 are diametrically opposed, while port 22 forms an angle of 90° with respect to the common axis of ports 20 and 24. In addition, ports 20, 22 and 24 have progressively decreasing diameters. The arrangement of the ports 20, 22 and 24 and their diameters are given by way of example only. It will be understood that a person skilled in the art would have no difficulty in varying the arrangement and diameters without thereby affecting the scope of the invention.

Housed inside the valve body 12 is a modulating member 26, also referred to as the rotating member, which is in the form of a generally cylindrical element extended by a shaft 28 directed along the axis XX. This shaft 28 passes through a central opening with a circular cover 30. This cover is screwed down onto a collar 32 of the valve body by four fixing bolts 34, with an interposed gasket (not shown). The modulating member 26 is turned about the axis XX by drive means 36 shown schematically in FIG. 1.

The latter may for example be a stepping motor capable of moving the modulating member 26 to multiple different positions, either by successive increments or continuously.

The modulating member 26 has a truncated end 38 consisting, in the example, of a planar face 40 forming an angle of around 45° with the axis of rotation XX. The modulating member 26 can therefore be used to control the fluid outlets 20, 22 and 24 in a manner defined by its angular position within the valve body.

Figure 3:
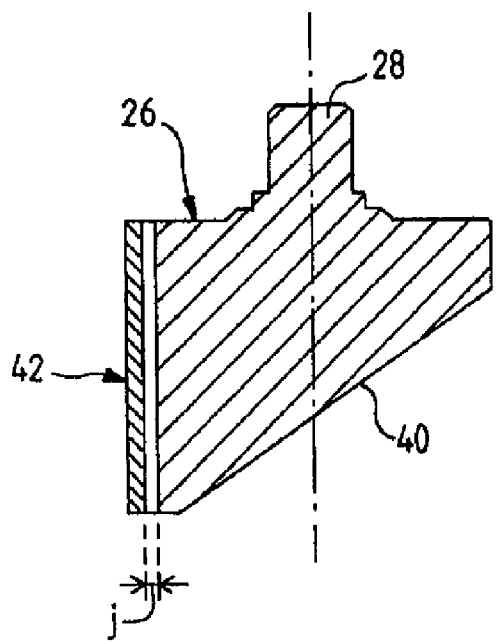
FIG. 3 is a corresponding cross section through the modulating member and its part-annular seal.
Figure 4:
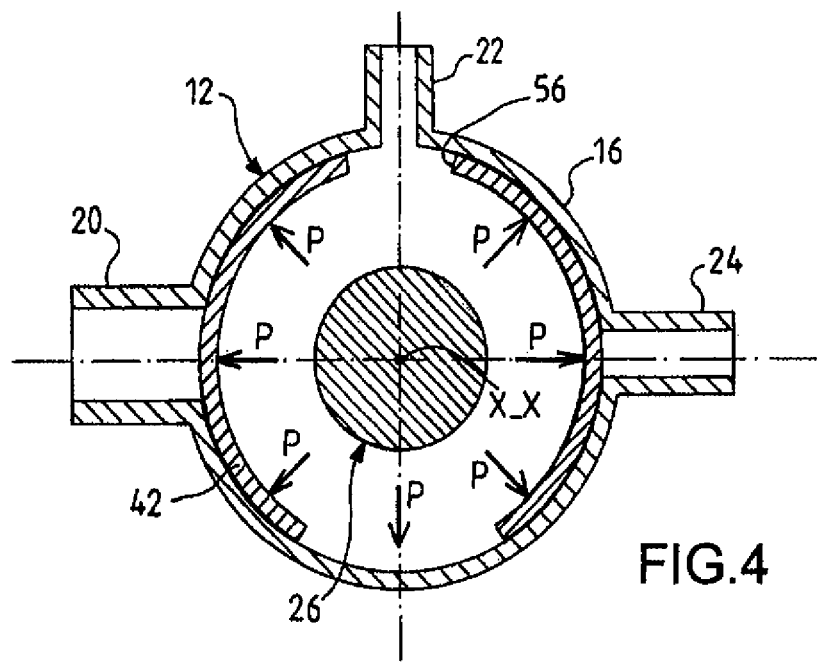
FIG. 4 is a diagrammatic cross section through the control valve seen in FIGS. 1 and 2, the cutting plane being perpendicular to the axis of rotation of the modulating member.
Figure 5:
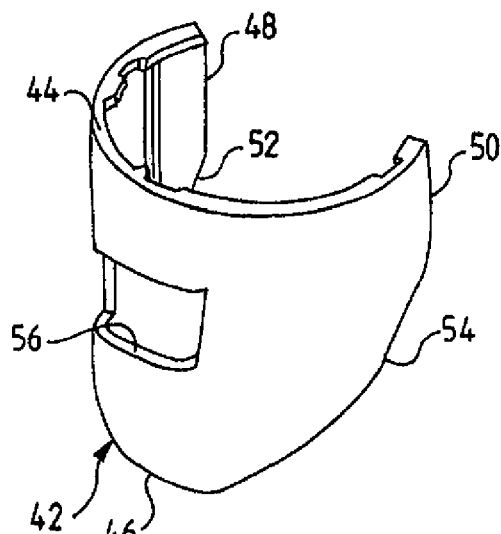
FIG. 5 is a perspective view of the part-annular seal.
Figure 6:
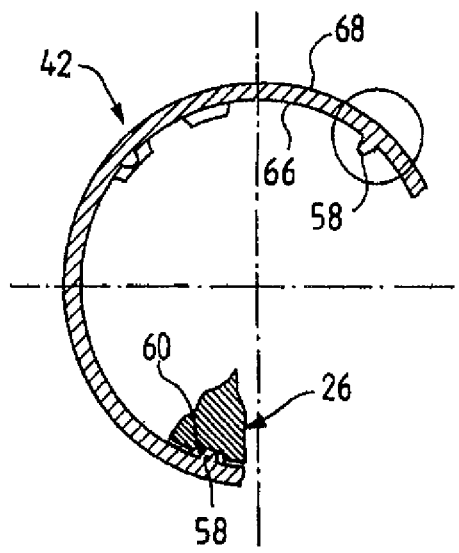
FIG. 6 is a transverse cross section through the part-annular seal seen in FIG. 5.
Figure 7:
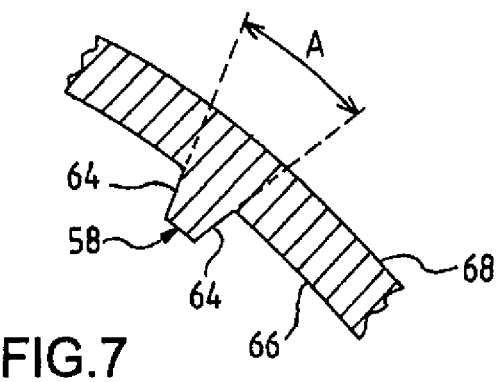
FIG. 7 is an enlarged detail from FIG. 6.

In a preferred embodiment, the modulating member 26 has around part of its perimeter a part-annular seal 42 in the shape of an open ring. This is coupled in rotation to the modulating member and is designed to make fluidtight contact with the inside face of the side wall 16. This part-annular seal, whose shape can be seen more clearly in FIGS. 5-7, is mounted with a small clearance j (FIG. 3) around the modulating member. This is to allow fluid entering the valve body through the inlet port 18 to exert outward radial pressure on an inside surface of the part-annular seal 42 so that an outside surface of the part-annular seal 42 is pressed radially against the side wall 16 to create a seal. This pressure is shown by the radial arrows P in FIG. 4. FIG. 4 is a schematic drawing and, in particular, the modulating member 26 is shown schematically, the clearance between it and the part-annular seal being intentionally greatly exaggerated.

As can be seen more particularly in FIGS. 5 and 6, the part-annular seal 42, which is in the shape of an open ring, has a generally cylindrical surface which fits the truncated shape of the envelope of the modulating member 26. The part-annular seal 42 is limited at the top by an arcuate edge 44, at the bottom by an edge 46, also arcuate, by two edges 48 and 50 generally parallel to the axis, and by the inclined edges 52 and 54. An opening 56 formed in the part-annular seal 42 is also provided.

On the inside face of the part-annular seal 42 are one or more ribs 58 parallel to the axis: the purpose of each of these is to engage with a slot 60, also parallel to the axis, on the perimeter of the modulating member (FIG. 6). This allows the part-annular seal to rotate with the modulating member while allowing the fluid to pass into the gap between the modulating member and the part-annular seal.

In the illustrative embodiment depicted, the rib 58, which can also be seen in detail in FIG. 7, is limited by two radial walls 64 which form an angle A of in this case 30° with each other. The radial walls 64 join onto an inside face 66 of the part-annular seal, on the opposite side form an outside face 68 (FIGS. 6 and 7).

Figure 8:
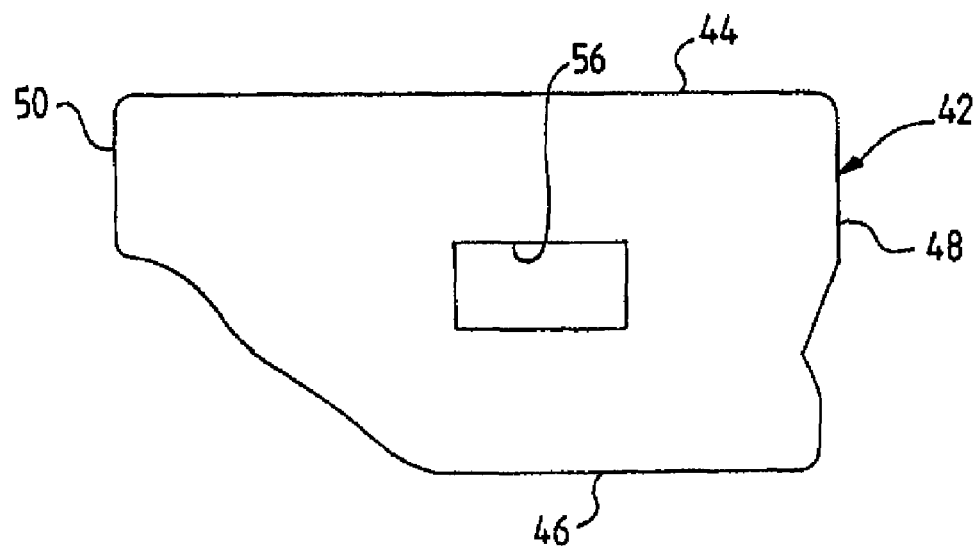
FIG. 8 shows the developed surface of the part-annular seal.

FIG. 8 shows the developed surface of the part-annular seal 42 in which the opening 56 forms a passage allowing fluid to pass into one of the fluid outlets, for example outlet 22, depending on the angular position of the part-annular seal 42.

It will be understood that the opening 56 is given here in an illustrative configuration, and that other openings having different shapes and/or one or more different location(s) on the part-annular seal 42 may be envisioned, particularly to allow for multiple fluid outlets in the side wall.

It will also be understood that the modulating member 26 may incorporate one or more openings corresponding to the opening or openings 56 of the part-annular seal 42.

Figure 9A:
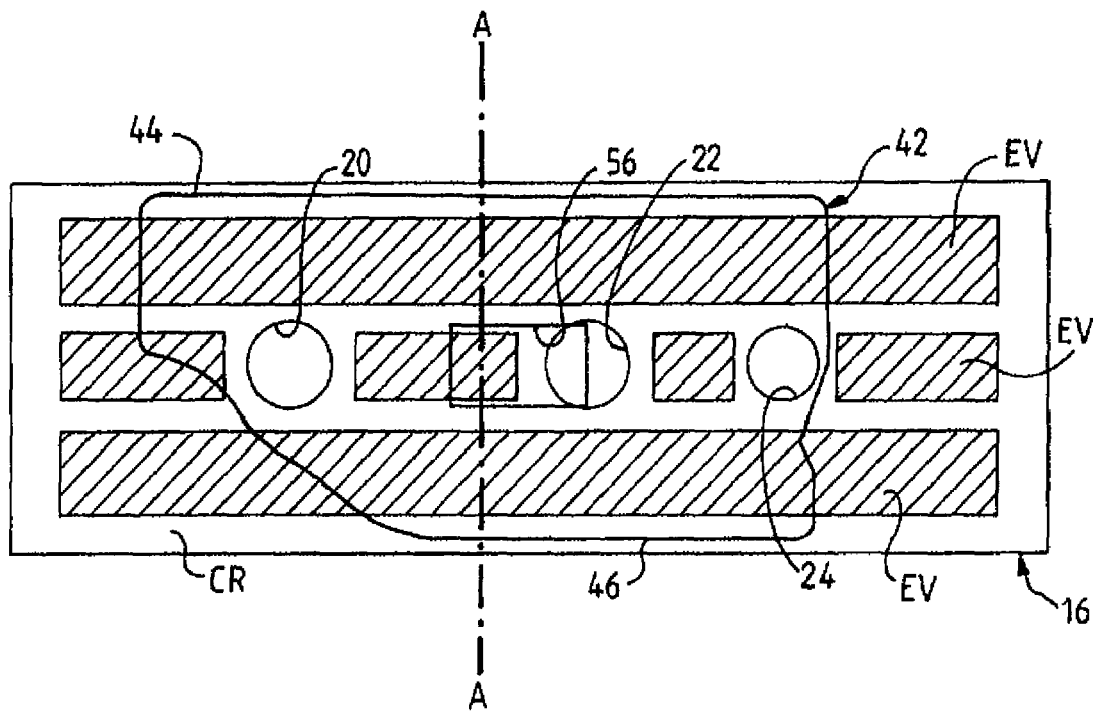
FIG. 9A shows the inside surface of the side wall of the control valve seen in FIG. 1 in developed form, with the surface from FIG. 8 shown on top.
Figure 9B:
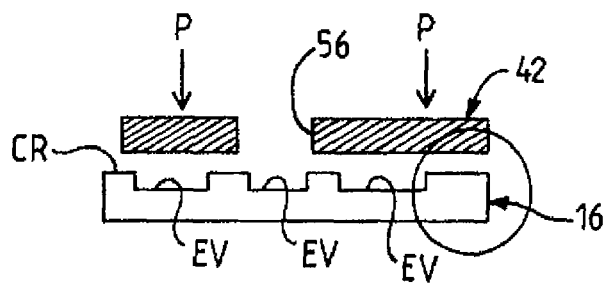
FIG. 9B is a cross section through the inside wall seen in FIG. 9A, the cutting plane passing through the axis AA.

FIG. 9A shows the developed side wall 16 with the part-annular seal 42 shown transparently on top of it for clarity. The part-annular seal 42 is pressed from the inside against the side wall 16. Varying the angular position of the part-annular seal 42 allows the proportion of the opening 56 lying in front of the fluid outlet 22 to be adjusted. In FIG. 9A the fluid outlet 22 is approximately half open. Sunken areas EV occur in the side wall 16 and are shown by hatched areas in FIG. 9A. These sunken areas EV are also shown in FIG. 9B which is a cross section through the assembly shown in FIG. 9A, parallel to the axis AA. The proportions and dimensions of the recesses, especially their depth, and the distance between the non-sunken area CR of the side wall 16 and the outside surface of the part-annular seal have been greatly exaggerated for the sake of clarity of illustration.

When the pressure of the fluid acts on the part-annular seal 42, as shown by the arrows P in FIG. 9B, the part-annular seal 42 presses against the inside of the side wall 16, and more specifically against the non-sunken areas CR of the side wall 16. Thus, by modifying the proportion of non-sunken areas CR to sunken areas EV, the amount of area of the part-annular seal in contact with the side wall can be controlled and reduced. In effect, friction between the part-annular seal 42 and the side wall 16 is reduced in proportion to the reduction of contact area.

The fluid can also enter the sunken areas EV and therefore form a layer of fluid between the side wall 16 and the part-annular seal 42. Since the pressure of the liquid in the sunken areas EV matches the pressure P of the fluid pressing the part-annular seal 42 against the side wall 16, the action of the pressure P is cancelled out by an opposite action from the pressure of the fluid present in the sunken areas EV, leading to a balancing of the pressure either side of the part-annular seal 42 in front of the sunken areas. The balancing of the pressure either side of the sunken areas EV limits the effect of the pressure that would tend to deform the part-annular seal 42 into the sunken areas of the side wall 16 all around the non-sunken areas CR and thus helps the part-annular seal 42 move relative to the side wall 16.

As shown in FIG. 9A, the sunken areas EV form approximately rectangular areas whose length is perpendicular to the axis of rotation of the part-annular seal.

The outlets 20, 22, 24 formed in the side wall 16 are advantageously defined by non-sunken areas CR. This provides better sealing around the outlets 20, 22, 24 and precise control of the flow of fluid through the outlets 20, 22, 24 during the angular positioning of the part-annular seal 42.

In the embodiment shown in FIG. 9A, non-sunken areas CR occur on the side wall. Notice for example the presence of two bands running the full length of the developed shape. These bands are tangent to the outlets 20, 22, 24.

Another non-sunken area is present around the perimeter of the side wall.

Two portions of the outside surface of the part-annular seal 42, which each form a boundary of the part-annular seal 42, and are located at respective opposite edges of the part-annular seal in the vicinity of the edges 44 and 46, are positioned above the non-sunken areas (CR) of the side wall 16.

The result is that, in this situation, the frictional torque between the part-annular seal and the valve body is considerably less than the frictional torque resulting from a configuration with no sunken areas in the side wall of the valve.

Figure 9C:
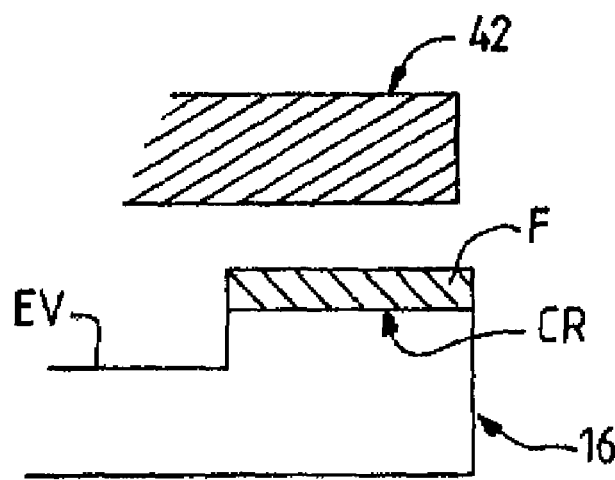
FIG. 9C is an enlarged detail from FIG. 9B in an illustrative embodiment of the invention.

FIG. 9C shows an enlarged detail from FIG. 9B in a preferred embodiment of the invention. The non-sunken area CR of the side wall 16 is covered by a film F of low-friction material. The film F has a lubricating function between the side wall 16 and the part-annular seal 42. The thickness of the film F is greatly exaggerated in the illustration, FIG. 9C. The thickness varies generally from 15 microns to 45 microns with a typical value of 25 microns. Another embodiment has the wall of the part-annular seal 42 facing the side wall 16 which is covered with the film F.

The film F may for example be made from one or more of the following materials: polyamides, polytetrafluoroethylene, polytetrafluoroethylene filled with molybdenum, epoxy phenolic resin filled with polytetrafluoroethylene and graphite, and polyamideimide filled with polytetrafluoroethylene. This nonexhaustive list is given by way of example only.

Figure 9D:
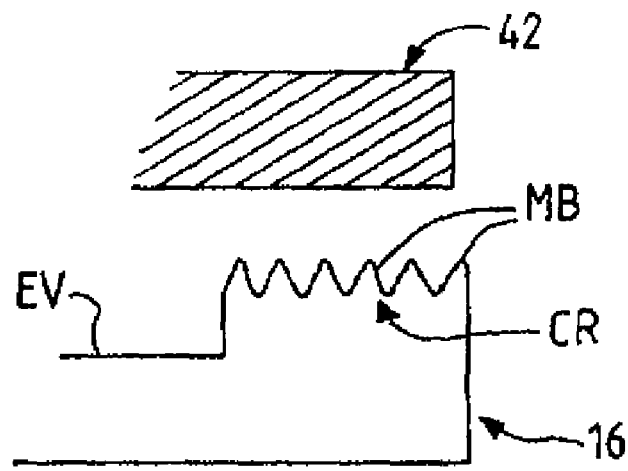
FIG. 9D is an enlarged detail from FIG. 9B in an illustrative embodiment of the invention.

FIG. 9D shows an enlarged detail from FIG. 9B in a preferred embodiment of the invention. The non-sunken area CR of the side wall 16 has microembossing MB shown very schematically in FIG. 9D. The microembossing MB allows a film of fluid (not shown in FIG. 9D) to arise between the side wall 16 and the part-annular seal 42. This fluid film has the advantage of further reducing friction between the side wall 16 and the part-annular seal without resulting in fluid leakage.

It will be understood that a person skilled in the art will be able to combine the embodiments described in respect of FIGS. 9C and 9D in a variety of combinations that fall within the scope of the present invention. For example, a microembossing can be carried out and the microembossing covered with a film of one or more materials as enumerated in the description of FIG. 9C. Thus, the surfaces of the non-sunken areas CR may for example be microembossed and covered with a film of molybdenum-filled polytetrafluoroethylene.

In another preferred embodiment of the invention, there is no part-annular seal around the perimeter of the modulating member 26. In this case the modulating member 26 can be as shown in FIG. 3, where the part-annular seal 42 is omitted.

In yet another embodiment of the invention, the modulating member has sunken areas around its perimeter. The shape of the developed perimeter may then resemble that of the part-annular seal described above with reference to FIG. 8. It is conceivable in such a configuration of the modulating member, that the side wall against which the perimeter of the modulating member presses has no sunken areas EV, in which case the reduction of the contact areas will effectively be obtained by the sunken areas on the part-annular seal. By this means, the friction torque between the modulating member and the valve body is considerably less than the friction torque resulting from a configuration that has no sunken areas in the modulating member. In this case the non-sunken areas of the wall of the part-annular seal facing the side wall and/or the side wall may also be covered with a film having a lubricating function as described earlier.

The sunken areas EV may form areas elongated in the length direction, in which the lengthwise edges are parallel with each other, and the widthwise edges are parallel to the nearest edge of the perimeter of the modulating member.

In the embodiments of the invention that have been described, it is possible, other things being equal, to use lower-power drive means 36 than in the prior art, without compromising the leaktightness properties.

Figure 10:
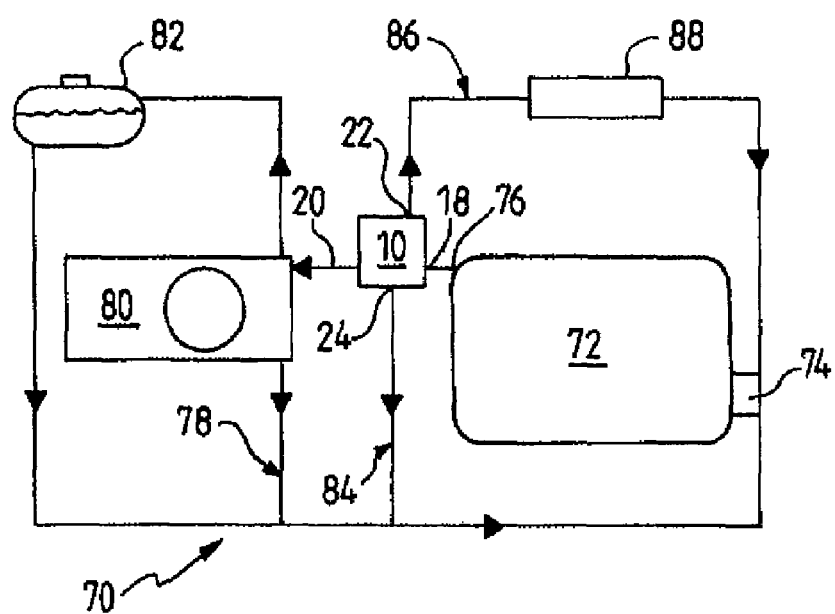
FIG. 10 shows a cooling circuit fitted with a control valve according to the invention for a heat engine of a motor vehicle.

The valve of the invention has a particular application to motor vehicles. FIG. 10 shows a circuit 70 for cooling a heat engine 72 in a motor vehicle. The circuit 70 carries a coolant, usually water to which antifreeze has been added, which is pumped around by a pump 74. The fluid is heated by the engine and then leaves the engine via an outlet 76 connected to the inlet port 18 of a control valve 10 of the type described above. This valve comprises three outlet ports 20, 22 and 24 connected to three lines of the circuit.

This circuit comprises a first line 78 containing a cooling radiator 80 and an expansion tank 82, a second line 84 branching off from the cooling radiator 80 and from the expansion tank 82, and a third line 86 containing an air heater 88 for heating the passenger compartment of the vehicle.

Port 20 is connected to line 78 (radiator), port 22 is connected to line 86 (air heater), and port 24 to line 84 (branch). The valve thus makes it possible to control independently the movement of fluid in the abovementioned three lines of the circuit, in order to optimize the temperature of the heat engine and the heating of the passenger compartment.

The invention is not of course limited to the embodiment described above, and is applicable to other variants. For example, the shape of revolution defined by the valve body is not necessarily cylindrical and could for example be conical or a frustum of a cone. The number and mutual arrangement of the outlet ports is open to many variants according to the application in question.

In general terms, the valve of the invention is of particular application to the automotive industry.

The invention claimed is:

1. A control valve for a fluid flow circuit comprising a body (12) that has a fluid inlet (18) and at least two fluid outlets (20, 22, 24) and that defines an axisymmetric housing, a modulating member (26) disposed within the housing and capable of rotating about an axis of rotation (XX) for adopting different angular positions to control the distribution of the fluid through the outlets, the body (12) comprising at least one side wall (16) with the side wall (16) having a developed shape which defines a full length, wherein the side wall (16) comprises sunken areas (EV) and non-sunken areas (CR) with the modulating member (26) in contact with the non-sunken areas (CR) and the sunken areas (EV) serving to reduce a surface area of the modulating member (26) in contact with the side wall (16), and at least one of the non-sunken areas (CR) of the side wall (16) extends along all of the full length of the developed shape.

2. The control valve as claimed in claim 1, in which the modulating member is made up of two parts, one of which two parts is a part-annular seal (42) in the shape of an open ring, which has an inside surface and an outside surface in contact with the non-sunken areas (CR) of the sidewall (16) with the part-annular seal (42) coupled in rotation to the modulating member (26), and the part-annular seal (42) is mounted with a small clearance (j) about the modulating member, so that the part-annular seal can be pressed against an inside of the side wall (16) so that the pressure (P) of the fluid has a sealing action.

3. The control valve as claimed in claim 1, in which the sunken areas (EV) and the non-sunken areas (CR) are located on an inside face of the side wall (16).

4. The control valve as claimed in claim 3, in which the non-sunken area (CR) of the side wall (16) in contact with an outside surface of the part-annular seal (42) is provided with microembossing (MB) to allow a fluid film to be created between the part-annular seal (42) and the non-sunken area (CR) of the side wall (16) in contact with the outside surface of the part-annular seal (42).

5. The control valve as claimed in claim 2, in which the non-sunken area (CR) of the side wall (16) in contact with the outside surface of the part-annular seal (42) is covered by a film (F) of low-friction material.

6. The control valve as claimed in claim 5, in which the low-friction material is chosen from the group comprising polyamides, polytetrafluoroethylene, polytetrafluoroethylene filled with molybdenum, epoxy phenolic resin filled with polytetrafluoroethylene and graphite, and polyamideimide filled with polytetrafluoroethylene.

7. The control valve as claimed in claim 1, in which the fluid outlets (20, 22, 24) formed in the side wall (16) are defined by non-sunken areas (CR).

8. The control valve as claimed in claim 2, in which the modulating member (26) and the part-annular seal (42) have reliefs (58, 60) of mating shapes to enable them to be coupled in rotation.

9. The control valve as claimed in claim 2, in which the side wall (16) of the valve body defines a cylindrical housing, and the outside surface of the part-annular seal (42) is a cylindrical outside surface.

10. The control valve as claimed in claim 1, in which the fluid inlet (18) opens axially into an end wall (14) of said valve body, and the fluid outlets (20, 22, 24) open radially into the side wall (16) of the valve body.

11. The control valve as claimed in claim 1, in which the sunken areas (EV) form essentially rectangular areas.

12. The control valve as claimed in claim 2, in which two portions of the outside surface of the part-annular seal (42) are positioned above the non-sunken areas (CR) of the side wall (16), each portion forming a boundary to the part-annular seal (42), and the portions being located at respective opposite edges of the part-annular seal.

13. A fluid flow circuit characterized in that it comprises a control valve as claimed in claim 1, in which the fluid inlet (18) is connected to a fluid source (76) and in which the fluid outlets (20, 22, 24) are connected to respective lines (78, 86, 84) of the circuit.

14. The fluid flow circuit as claimed in claim 13, characterized in that it is constructed in the form of a cooling circuit (70) for a motor vehicle heat engine (72) through which a coolant is pumped by a circulating pump (74), and in that the control valve (10) is a three-way valve whose fluid inlet (18) is connected to an intake (76) of coolant from the engine (72) and whose three fluid outlets (20, 22, 24) are connected respectively to a first circuit line (78) containing a cooling radiator (80), to a second circuit line (84) forming a 10 branch of the cooling radiator (80), and to a third circuit line (86) containing an air heater (88) for heating the passenger compartment.

15. The control valve as claimed in claim 2, in which the sunken areas (EV) and the non-sunken areas (CR) are located on an inside face of the side wall (16).

16. The control valve as claimed in claim 15, in which the non-sunken area (CR) of the side wall (16) in contact with the outside surface of the part-annular seal (42) is covered by a film (F) of low-friction material.

17. The control valve as claimed in claim 3, in which the non-sunken area (CR) of the side wall (16) in contact with the outside surface of the part-annular seal (42) is covered by a film (F) of low-friction material.

18. The control valve as claimed in claim 4, in which the non-sunken area (CR) of the side wall (16) in contact with the outside surface of the part-annular seal (42) is covered by a film (F) of low-friction material.

19. The control valve as claimed in claim 2, in which the fluid outlets (20, 22, 24) formed in the side wall (16) are defined by non-sunken areas (CR).

20. The control valve as claimed in claim 3, in which the fluid outlets (20, 22, 24) formed in the side wall (16) are defined by non-sunken areas (CR).

* * * * *

UNITED STATES PATENT AND TRADEMARK OFFICE
CERTIFICATE OF CORRECTION

| | | |
|---|---|---|
| PATENT NO. | : 8,347,831 B2 | Page 1 of 1 |
| APPLICATION NO. | : 12/092533 | |
| DATED | : January 8, 2013 | |
| INVENTOR(S) | : Vacca et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1123 days.

Signed and Sealed this
Seventeenth Day of June, 2014

Michelle K. Lee
*Deputy Director of the United States Patent and Trademark Office*